April 24, 1951 L. H. McCARRON 2,550,076

FIRE ALARM

Filed Nov. 8, 1948

LEWIS H. McCARRON,
INVENTOR.

BY W E Beatty

ATTORNEY.

Patented Apr. 24, 1951

2,550,076

UNITED STATES PATENT OFFICE 2,550,076

FIRE ALARM

Lewis H. McCarron, Los Angeles, Calif.

Application November 8, 1948, Serial No. 58,869

3 Claims. (Cl. 179—5)

The invention relates to a fire alarm for use with the ordinary dial telephone system.

While fire alarms of this general type have been proposed heretofore, some of them fail to consider that the telephone line may be dead, that is, with no idle trunk available, at the start, hence when the alarm dials a particular number, some of the dialing impulses are lost which results in dialing a wrong number.

Certain other alarm systems of this general type are very complicated, and propose to dial a special signal over a special trunk line.

The present invention provides a fire alarm which takes advantage of the fact that the operator's line number 111 has not been assigned for use and it takes further advantage of the fact that it is not necessary to dial a special signal over a special trunk line, because the operator can identify any line which is calling.

The present invention overcomes the fact that the telephone line may be dead at the start, by dialing a prolonged series of impulses which in effect dials the number 111 in succession.

The alarm of this invention is so arranged that the dialing contacts do not interfere with the normal use of the telephone and are brought into play when a fire occurs, by an improved simple mechanism wherein a thermostat directly controls an escapement device for the dial of the fire alarm.

For further details of the invention reference may be made to the drawings wherein—

Figures 1, 2, 3:
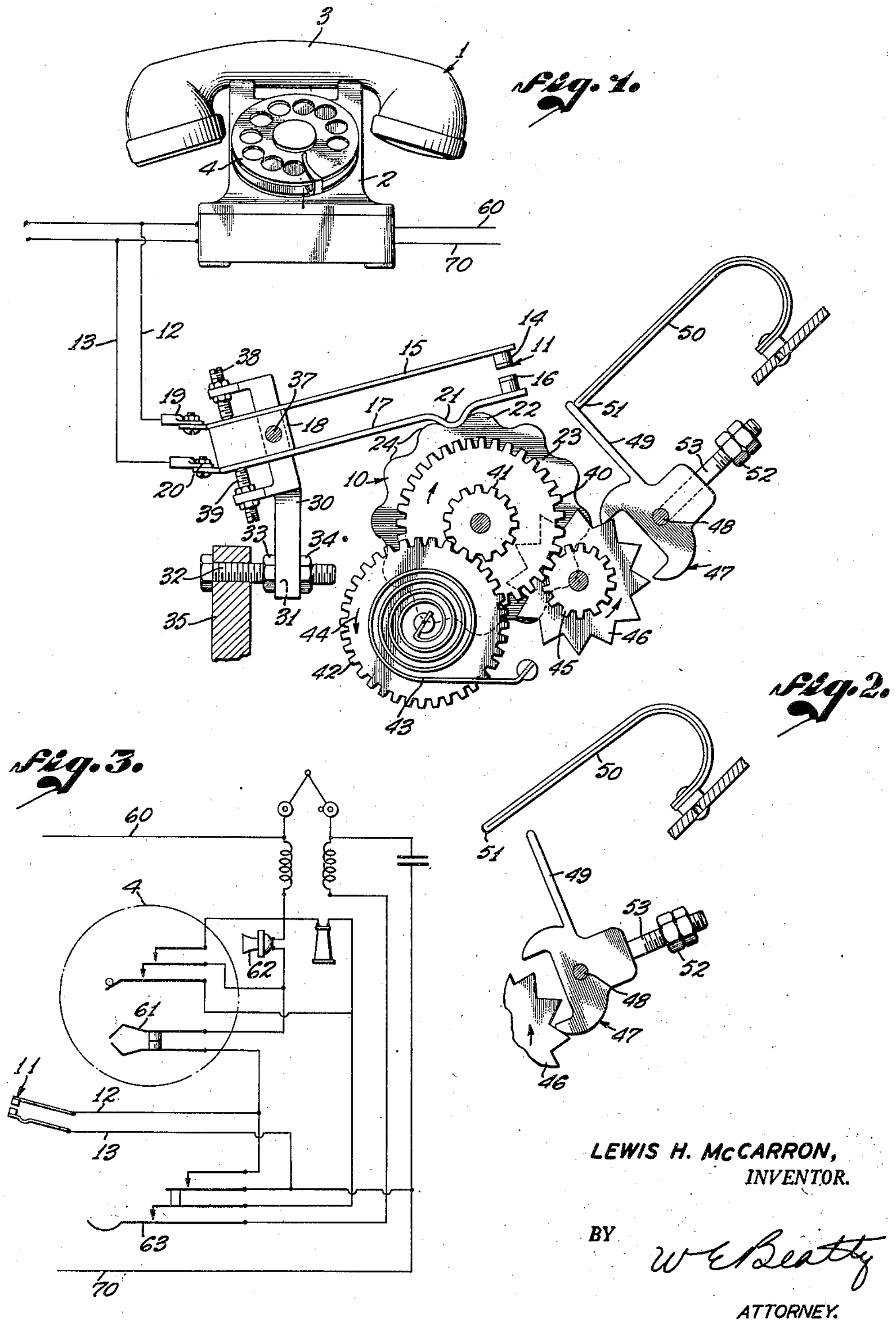
Fig. 1 is a diagrammatic illustration showing the fire alarm of this invention connected to a conventional subscriber's dial telephone.
Fig. 2 is a schematic elevation of the thermostat control of Fig. 1, with parts broken away.
Fig. 3 is a schematic circuit showing the fire alarm in circuit with the usual dial telephone.

Referring in detail to the drawings, in Fig. 1 the usual subscriber's dial telephone is indicated at 1 as having the usual stand 2, handset 3 and dial 4. The usual cord connecting the stand 2 to the handset 3 is not illustrated. Connected to the stand 2 is the usual telephone line 60, 70.

The invention provides a special dial 10 having contacts 11 which are shown in Fig. 3 as connected by wire 12, through impulse switch 61 and transmitter 62 to line 60, and by wire 13 to line 70, hook switch 63 being open. The contacts 11 in this case are open when the fire alarm is idle so as not to interfere with the ordinary use of the telephone.

As shown in Fig. 1, the contacts 11 comprise an upper contact 14 connected to a strip 15 and a lower contact 16 connected to a spring strip 17. The strips 15 and 17 are suitably secured to an insulating block 18. Strip 15 has a suitable terminal 19 connected to the line 12 and strip 17 has a suitable terminal 20 connected to line 13.

Strip 17 has a downwardly facing convex portion 21 which serves as a cam follower for the cams 22 on the dialing wheel 23. The cams 22 form a complete sinusoidal series around the periphery of the wheel 23. When wheel 23 rotates, each lobe like 24 actuates the cam follower 21 to close the contacts 11 and send a dialing impulse over the telephone lines 60, 70.

The cam follower 21 may be adjusted in position with respect to any particular lobe 24 at the top of wheel 23 as the block 18 and its contact strips 15 and 17 are carried by a bracket 30 which has an aperture 31 to receive a bolt 32 having locknuts 33 and 34. This bolt 32 is carried by a suitable support indicated at 35. Bracket 30 is adjustable to move cam 21 along the periphery of wheel 23. Also the block 18 and contacts 11 can be moved toward or away from the wheels 23, as bracket 30 forms a pivotal support therefor, indicated at 37, bracket 30 also having adjusting screws 38 and 39 which bear on the opposite sides of the strips 15 and 17 to angularly adjust the position of the cam follower 21.

Wheel 23 has fixed thereto a gear 40. Fixed to gear 40 is a pinion 41 which meshes with a gear 42 driven by a spring indicated at 43. Spring 43 may be wound up by means well known and not illustrated. When spring 43 unwinds, it rotates gear 42 in a counter-clockwise direction as indicated by arrow 44, to drive the wheel 23 clockwise. Rotation of wheel 23 is controlled as follows. Gear 40 meshes with a pinion 45 having fixed thereto a ratchet wheel 46 having an escapement pawl 47 which oscillates on a pivot indicated at 48. Pawl 47 has an arm 49. The thermostat 50 when idle has an outer end 51 which serves as an abutment or stop which bears against the arm 49 to prevent operation of the pawl 47. The thermostat 50 is located at a suitable place in the building. When a fire occurs, the thermostat 50 expands, whereby its outer end 51 moves away from the arm 49 as shown in Fig. 2, to release the pawl 47 and permit the spring 43 to drive the wheel 23.

The speed of operation of the pawl 47 is regulated by means of a sliding weight, here shown as a nut 52 on a bolt 53 fixed to and projecting from the pawl 47.

A duplicate of the above fire alarm can of course be located at various other places in a building, all of such alarms being connected to the lines 12, 13.

Various modifications may be made in the invention without departing from the spirit of the following claims. For example, the line 13 may be connected to line 70 through a switch contact controlled by hook switch 63, such contact being closed or open as the receiver is off or on the hook, respectively, to disconnect the fire alarm when its receiver is removed.

The invention is quite simple as the contacts 11 are directly connected to the telephone and the thermostat 50 directly controls the escape 46, 47 for the dialing wheel 23.

As the wheel 23 has an uninterrupted series of sinusoidal peaks like 24, the wheel 23 when released by the thermostat 50, will in effect repeatedly dial the number 111 so that this will come to the attention of a special operator who can be assigned to the line 111 at the central station. Such operator has facilities for quickly identifying the calling line and thereupon can attempt to put through a telephone call to the building where the fire alarm is in operation to see whether someone is present there to put in a fire alarm or take necessary steps. In the event that the subscriber does not answer such call, the operator can identify the calling line and its address and put in a fire alarm.

I claim:

1. Fire alarm apparatus for a dial telephone system having automatic switching equipment and a special line, said apparatus comprising dial means for producing dialing impulses in a prolonged series of unit digits, means for supplying said impulses to a subscriber's line of said system to operate the automatic switching equipment of said system and select said special line, a motor for said dial means, an escapement for controlling operation of said motor and a thermo-responsive movable abutment for controlling said escapement.

2. Fire alarm apparatus comprising dial contacts, a dial wheel for operating said contacts, a motor for driving said wheel, an uninterrupted series of dialing projections around said wheel, a ratchet wheel, for said dial wheel, a pawl for said ratchet wheel, an arm on said pawl and a bimetallic strip having a free end, and means supporting said strip with said free end in position to abut said arm at certain times and not at other times as influenced by temperature.

3. Fire alarm apparatus comprising dial contacts, a dial wheel for operating said contacts, a motor for driving said wheel, an uninterrupted series of dialing projections around said wheel, a bimetallic strip having a free end, means restraining operation of said motor, and means supporting said strip with its free end in position as a movable abutment controlling said restraining means.

LEWIS H. McCARRON.

REFERENCES CITED

The following references are of record in the file of this patent:

UNITED STATES PATENTS

| Number | Name | Date |
|---|---|---|
| 1,029,577 | Clement | June 11, 1912 |
| 1,147,014 | Gottschalk | July 20, 1915 |
| 1,148,014 | Gottschalk | July 27, 1915 |
| 2,104,998 | Lill et al. | Jan. 11, 1938 |